(12) United States Patent
Kühn et al.

(10) Patent No.: US 7,156,732 B2
(45) Date of Patent: Jan. 2, 2007

(54) DEVICES FOR REGULATING THE PROCESSING OF HARVESTED CROP

(75) Inventors: Bodo Kühn, Gütersloh (DE); Franz Heidjann, Harsewinkel (DE)

(73) Assignee: Claas Selbstfahrende GmbH (DE)

( * ) Notice: Subject to any disclaimer, the term of this patent is extended or adjusted under 35 U.S.C. 154(b) by 199 days.

(21) Appl. No.: 10/899,279

(22) Filed: Jul. 26, 2004

(65) Prior Publication Data

US 2005/0003876 A1 Jan. 6, 2005

Related U.S. Application Data

(63) Continuation of application No. 10/027,019, filed on Dec. 20, 2001, now Pat. No. 6,860,805.

(30) Foreign Application Priority Data

Dec. 21, 2000 (DE) ............................... 100 64 356

(51) Int. Cl.
*A01F 12/40* (2006.01)
(52) U.S. Cl. ...................................... 460/111; 460/901
(58) Field of Classification Search ........ 460/111–112, 460/901

See application file for complete search history.

(56) References Cited

U.S. PATENT DOCUMENTS 2,708,582 A * 5/1955 Adams ....................... 239/650

(Continued)

FOREIGN PATENT DOCUMENTS

EP 0357090 * 9/1989 ................ 460/112

Primary Examiner—Meredith C. Petravick

(74) *Attorney, Agent, or Firm*—Husch & Eppenberger LLC; Robert C. Haldiman

(57) ABSTRACT

An agricultural machine having at least one crop processing work unit, a plurality of crop transport units operatively assembled as a straw walker step, wherein the crop transport units convey crop streams in opposite directions and are spaced apart defining a crop through-gap, and a cleaning device having a forced-draught fan before the cleaning device, further comprising an exhaust fan located after the cleaning device, wherein the transport units are located between the forced-draught fan and the exhaust fan, wherein an air stream is produced by the forced-draught fan and the exhaust fan and is directed from the forced-draught fan to the exhaust fan, and wherein the air stream improves a cleaning process in the straw walker through-gap of the straw walker step.

An agricultural machine having at least one crop processing work unit and an exhaust fan for carrying away a portion of the crop processed by working members for processing a plurality of crop streams out of an agricultural machine, comprising a crop distributing device operatively connected to the exhaust fan and having guide webs that are variable in position, wherein the crop distributing device has a first working position for receiving a first of the crop streams and a second of the crop streams and a second working position for receiving one of the crop streams, wherein in the first working position the first and the second crop streams are combined and discharged for broadcasting as a common crop stream, and wherein in the second working position the first of the crop streams is received and discharged and the second of the crop streams is conveyed and discharged from the working members in swath form separate from the first of the crop streams. The crop streams passing through the agricultural machine are conveyed with less turbulence. Long-stalked straw is deposited in a swath for later use, and short-stalked straw and chaff are discharged out of the agricultural harvester separate from and without whirling up again the crop swath.

20 Claims, 3 Drawing Sheets

U.S. PATENT DOCUMENTS

| | | | | |
|---|---|---|---|---|
| 4,056,107 A | * | 11/1977 | Todd et al. | 460/112 |
| 4,921,469 A | * | 5/1990 | Scharf | 460/10 |
| 5,120,275 A | * | 6/1992 | Zacharias | 460/111 |
| 5,569,081 A | * | 10/1996 | Baumgarten et al. | 460/112 |
| 6,656,038 B1 | * | 12/2003 | Persson | 460/112 |
| 7,063,613 B1 | * | 6/2006 | Weichholdt | 460/112 |
| 2004/0092298 A1 | * | 5/2004 | Holmen | 460/111 |
| 2004/0137974 A1 | * | 7/2004 | Weichholdt | 460/112 |
| 2004/0242291 A1 | * | 12/2004 | Weichholdt | 460/112 |

\* cited by examiner

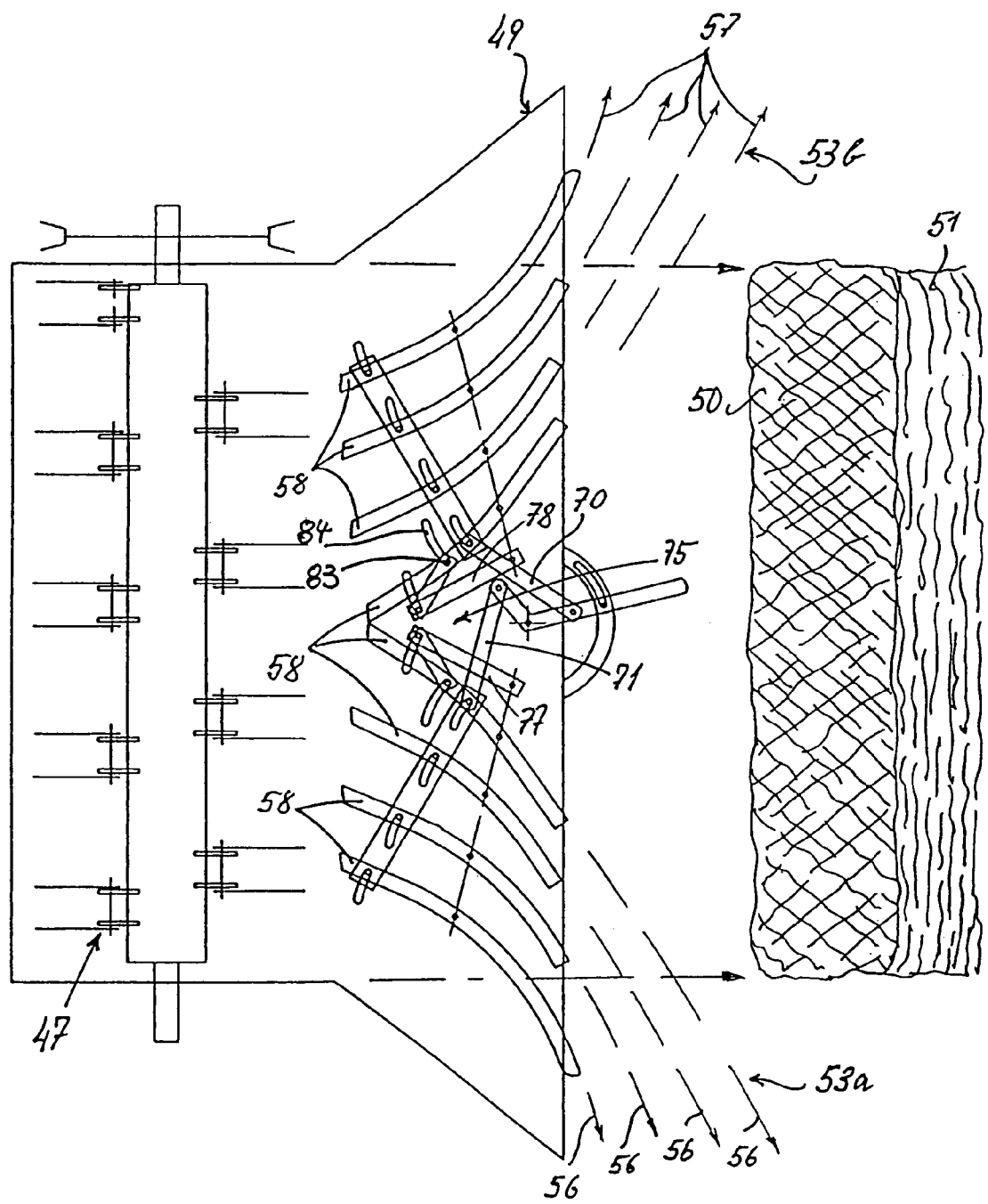

DEVICES FOR REGULATING THE PROCESSING OF HARVESTED CROP

CROSS-REFERENCE TO RELATED APPLICATIONS

This application is a continuation of U.S. application Ser. No. 10/027,019 filed Dec. 20, 2001 now U.S. Pat. No. 6,860,805.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention relates to an agricultural machine, and more specifically to devices for improving, controlling and regulating the processing of harvested crop.

2. Related Art

German Patent Application No. DE 196 24 733 A1 describes an agricultural combine harvester having threshing members and a grain/straw separator in a rear region constructed as a rack vibrator. A return pan is located below the grain/straw separator for conveying grain that is separated by the grain/straw separator opposite the direction of the crop being threshed. The separated crop is transferred to a cleaning device having sieve elements. An air flow stream created by a forced-draught fan flows through holes in the sieve elements. The cleaning device quickly reaches its limit when throughputs are high. An exhaust fan is associated with the return pan, wherein the exhaust fan extracts non-grain components from the crop stream passing through the cleaning device. Hence, the cleaning device is supplied with a crop mixture interspersed with fewer contaminants. Because the crop stream of the return pan and the crop stream located on the grain pan have opposite directions of movement resulting in strong turbulence, the crop steams are not uniform toward a rear end of the agricultural combine harvester. This disturbance in crop flow results in an inefficient cleaning capacity.

European Patent No. EP 0 314 695 B1 describes comminuting and mixing devices. The comminuting and mixing devices are important for distributing chopped cereal straw over a field, thereby accelerating the rotting process of the chopped cereal straw.

The present invention is directed to overcoming one or more of the problems set forth above.

SUMMARY OF THE INVENTION

An aspect of the present invention is to provide an apparatus and method for overcoming one or more of the problems set forth above.

In accordance with the present invention, there is provided an agricultural harvester for discharging non-grain components without substantial turbulence or interference, wherein the non-grain components and grain are transported together or separately from each other and without affecting each other.

In one aspect of the present invention, there is provided a cleaning device having a forced-draught fan, exhaust fan and crop transport units for improved cleaning.

In another aspect of the present invention, an exhaust fan used in conjunction with a cleaning device and at least two crop transport units in a rear region in a vertical direction, are used for generating an air stream in the direction of the exhaust fan through the region of a straw walker step between the crop transport units to ensure that the crop streams, which meet in the region of the straw walker step and have opposite directions of movement, do not create turbulence obstructing crop flow, thereby reducing crop congestion and improving cleaning capacity.

In yet another aspect of the present invention, the exhaust fan can be constructed as a crop comminutor, wherein the crop streams entering the crop comminutor are mixed together and large pieces of crop, for example straw, are comminuted into short pieces to promote degrading after being discharged from the agricultural combine harvester into a field.

In yet another aspect of the present invention, there is provided an adjustable air stream in a straw walker step between at least two crop transport units in a direction towards an exit end of the agricultural harvester, wherein the air stream is adjusted to the changing harvesting conditions.

In still another aspect of the present invention, the speed of the air steam is regulated according to the harvesting conditions, the type of harvested crop and the throughput of the harvested crop because these factors have a determining influence on the separation efficiency of a cleaning device.

In yet still another aspect of the invention the speed of the exhaust fan is manually or automatically adjustable, thereby adjusting the speed of the air stream.

In yet still another aspect of the present invention, there are speed measuring devices for instantaneously and accurately detecting, controlling and regulating the air stream speed in the region of the straw walker step.

In still another aspect of the present invention, there is a control and regulating unit for regulating an air stream in the region of a straw walker step, wherein a preset speed value is used as an optimum set point, and wherein the set point can be influenced by the type of crop and/or moisture content of the crop being harvested.

The above aspects are merely illustrative examples of a few of the innumerable aspects associated with the present invention and should not be deemed an all-inclusive listing in any manner whatsoever.

BRIEF DESCRIPTION OF THE DRAWINGS

Reference is now made to the drawings, which illustrate the best known mode of carrying out the invention and wherein the same reference characters indicate the same or similar parts throughout the views.

FIG. 4 is a top view of a crop distributing device illustrating a "swath" working position.

DETAILED DESCRIPTION OF THE PREFERRED EMBODIMENTS

Figure 1:
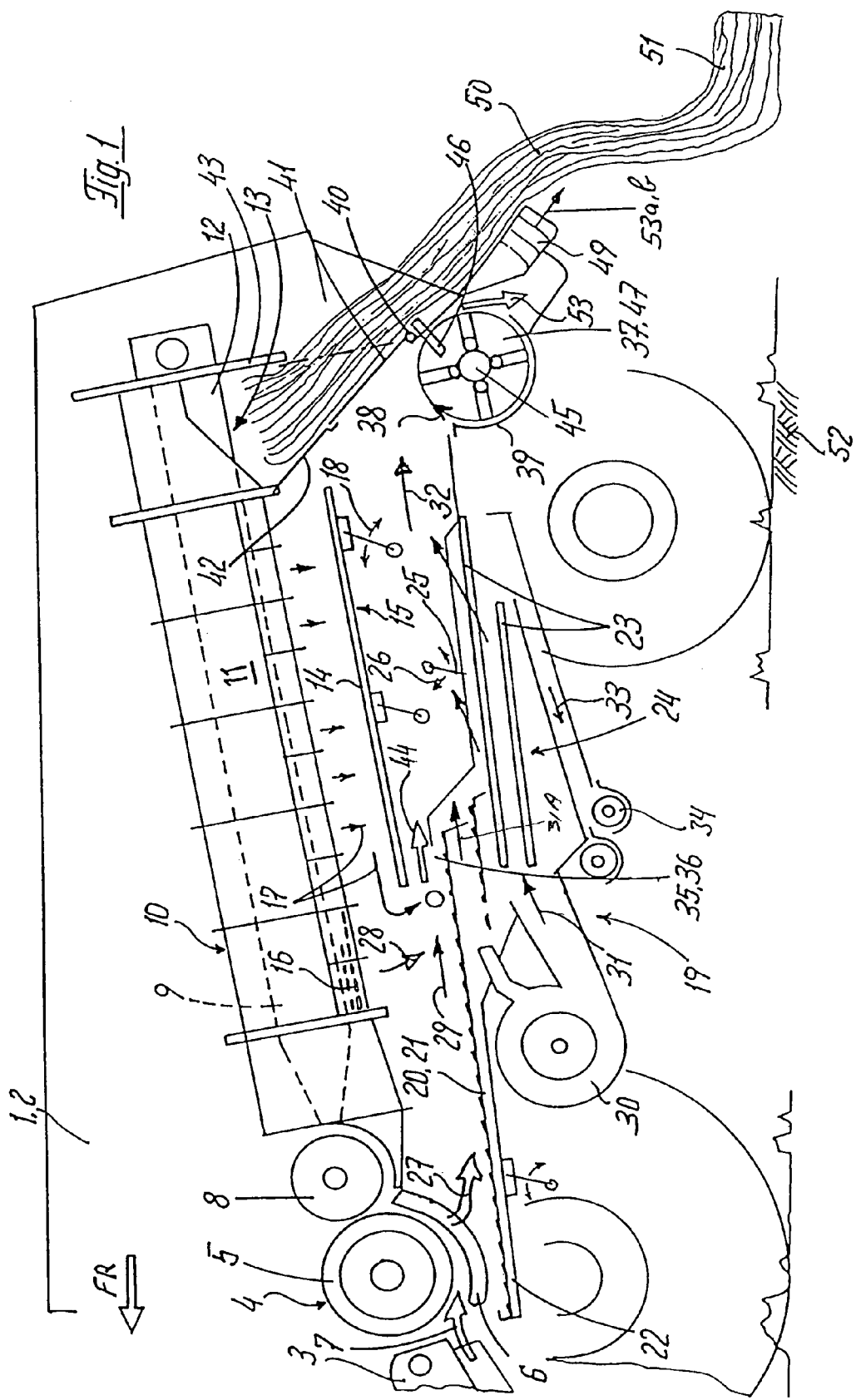
FIG. 1 is a cross sectional side view of an agricultural harvester.

FIG. 1 shows an agricultural harvester 1 constructed as a combine harvester 2. The combine harvester 2 has a feed rake 3 operatively attached to its front end for harvesting crop. The function and elements of the feed rake 3 are known in the art and no further explanation is required. A single-cylinder threshing mechanism 4 receives the harvested crop from the feed rake 3 as shown by the crop stream 7. The single-cylinder threshing mechanism 4 passes the crop stream 7 between a threshing cylinder 5 and a concave 6, wherein some grain or crop stream 27 is passed to a grain pan 20. Thereafter, the crop stream 7 is transferred to a transfer cylinder 8, which transfers the crop stream 7 to a grain/straw separator 10. The grain/straw separator 10 is constructed as an axial separation rotor 9, wherein the axial separator rotor 9 has an inside separation rotor 12, which is at least partially encased in a rotor housing 11. The crop stream 7 is conveyed between a separation rotor 12 and the rotor housing 11 to a rear region of the separation rotor 12 due to rotational movement. In the rear region of the separation rotor 12, the rotor housing 11 has a bottom opening 13 for the crop stream 7 to pass out of the grain/straw separator 10.

Below the axial separation rotor 9 is a first crop transport unit 15 constructed and functioning as a return pan 14. The first crop transport unit 15 is at an incline, or transverse to the ground, and catches crop stream 17 that was separated. The crop stream 17 passes through openings 16 of the rotor housing 11 to the return pan 14. The return pan 14 is driven in oscillation, as shown by arrows 18, so that the crop stream 17 is gradually conveyed down the incline.

A crop preparation and cleaning device 19, having a grain pan 20 that does not rotate and is operatively connected by a frame structure 22 to a cleaning device 24, is located below the single-cylinder threshing mechanism 4, the transfer cylinder 8 and the axial separation rotor 9. In the preferred embodiment, the cleaning device 24 has sieve levels 23. The frame structure 22 receives the grain pan 20 and the sieve levels 23 and is rotatably mounted in the agricultural machine 1 by rocker arms 25. The rotational movement of the frame structure 22 results in an oscillation movement, as shown by arrows 26.

The grain pan 20 is at an incline or transverse with respect to the ground and extends below the single-cylinder threshing mechanism 4 and the transfer cylinder 8. The grain pan 20 receives the crop stream 27 separated in the region of the single-cylinder threshing mechanism 4, the crop stream 28 separated in the front region of the axial separation rotor 9 and the separated crop stream 17 from the return pan 14. Due to the oscillating movement 26 of the grain pan 20, the crop streams 27, 28, 17 are combined and conveyed as a common crop stream 29 away from the transfer cylinder 8, so that the grain pan 20 forms a second crop transport unit 21.

In the rear region of the grain pan 20, the crop stream 29 is transferred to the sieve levels 23 of the cleaning device 24. Because of the oscillating movement 26, the harvested crop is conveyed into an end region of the cleaning device 24 facing away from the direction of travel FR of the agricultural harvester 1. To increase the cleaning capacity of the sieve levels 23, a forced-draught fan 30 is used to generate an air stream 31 flow through the sieve levels 23 to convey light components 32 of the crop stream 29 into the rear region of the combine harvester 2. The grains 33 located in the crop stream 29 from the grain pan 20 are separated by the sieve levels 23 and conveyed by conveying members 34 out of the region of the cleaning device 24.

The return pan 14 and the grain pan 20 are vertically staggered, forming a straw walker step 36, which defines a through-gap 35. The crop stream 17 of the return pan 14 and the crop stream 27 of the grain pan 20 move in opposite directions to each other and combine or mix into a common crop stream 29 in the through-gap 35. During this mixing process, turbulence may be created, which hinders crop flow in the region of the straw walker step 36. In certain circumstances, the crop flow is brought to a complete standstill. An exhaust fan 37 is operatively mounted in a rear section of the agricultural harvester 1 to facilitate movement of the crop flow. The exhaust fan 37 rotates in the direction shown by arrow 38 and is at least partially surrounded by a casing 39. A crop guide element 41 pivotably mounted to a shaft 40 at a first end above the exhaust fan 37. The crop guide element 41 is transverse to the direction of travel FR and removably connected to a guide plate 42 at a second end. The guide plate 42 is below the bottom opening 13 and fixed to the frame or a closure plate 43 arranged in the rear region of the grain/straw separator member 10. The exhaust fan 37 is used with at least two of the crop transport units 15, 21 and the cleaning device 24 such that an air stream 31, created by the forced-draught fan 30 through the sieve levels 23 area of the cleaning device 24 and an air stream 44 through the through-gap 35 in the region of the straw walker step 36, avoids agitating the crop streams 17, 27 when combined as crop stream 29 at different directions and assists the movement of the combined crop stream 29, to the rear region of the agricultural harvester 1. By reducing turbulence that obstructs crop flow, crop congestion inside the agricultural harvester 1 is avoided, thereby improving the cleaning capacity.

A rotor 45 of the exhaust fan 37 has a plurality of cutter blades (not shown) circumferentially mounted thereto, which cooperate with shear bars 46, so that the exhaust fan 37 is also designed as a crop comminutor 47.

Figures 2, 3:
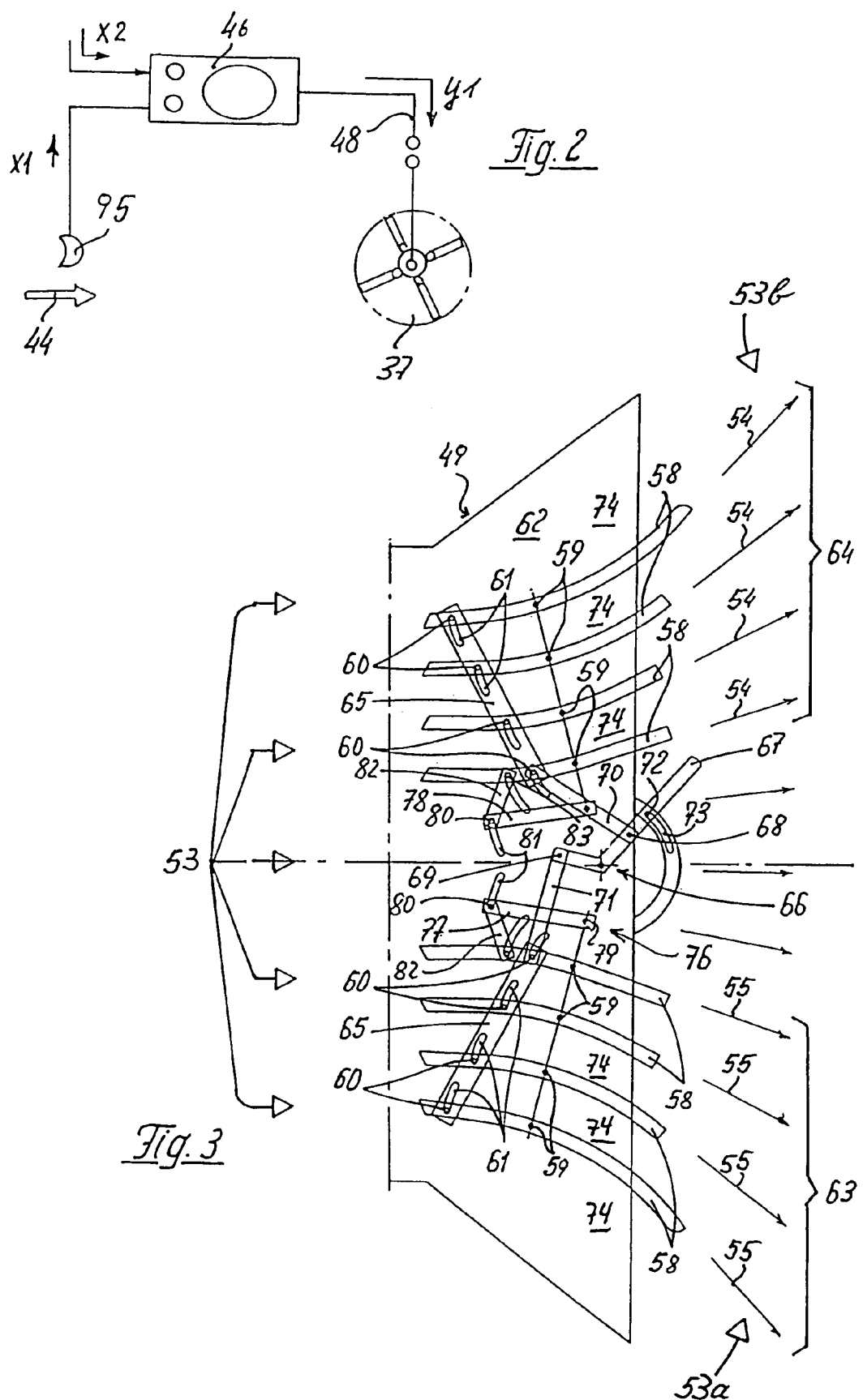
FIG. 2 is a schematic of a control and regulating device.
FIG. 3 is a top view of a crop distributing device illustrating a "broadcast" working position.

The speed of the air stream 44 in the region of the straw walker step 36 is easily varied, so that it can be adapted to different harvesting conditions, such as the type of crop and/or crop throughput and moisture content in the crop. A sensor mechanism 95 is operatively mounted in the region of the straw walker step 36 for monitoring and communicating the speed of the air stream 44 to a control and regulating unit 46. The sensor mechanism 95 is known to those skilled in the art. Turning now to FIG. 2, there is shown the control and regulating unit 46 for controlling and regulating the speed of the air stream 44 in the region of the straw walker step 36. A pre-assigned speed value X2 is entered into the control and regulating unit 46. The speed value X2 is the desired speed of the air stream 44. The sensor mechanism 95 is operatively mounted in the straw walker step 36 area and senses the speed of the air stream 44 and supplies a measured value X1 to the control and regulating unit 46. The measured value X1 is compared to the speed value X2 in the control and regulating unit 46, and the control and regulating device 46 adjusts the speed of the air stream 44 if the measured value X1 is not at the preset desired speed value X2. The control and regulating device 46 adjusts the speed of the air stream 44 by generating an output signal Y1 to either increase the speed of rotation of the exhaust fan 37 when the speed of the air stream 44 is below the preset speed value X2, or to decrease the speed of rotation of the exhaust fan 37 when the speed of the air stream 44 is above the preset speed value X2. In alternative embodiments, the preset speed value X2 includes one or more speed ranges and the output signal Y1 generated by the control and regulating device 46 is an electrical, mechanical, hydraulic or pneumatic output signal Y1. A transmission system 48 required to accomplish this is known to those skilled in the art and is not described in more detail. In one embodiment, the speed value X2 is determined by considering the type of crop being harvested, throughput and/or the moisture present in the crop being harvested to obtain an optimum preset speed.

A crop distributing device 49 is operatively connected to a crop comminutor 47 to reduce crop congestion and blockage in the rear region of the crop comminutor 47. The crop distributing device 49 facilitates the discharge of straw and other materials. The crop distributing device 49 is used to direct or control the distribution of crop exiting the exhaust fan 37 constructed as the crop comminutor 47 over the field, and the comminuted crop string is distributed over the field for the working width of the agricultural harvester 1.

The crop guide element 41 is pivotably mounted to the shaft 40 above the exhaust fan 37. The crop guide element 41 is operatively connected to the crop comminutor 47. The crop guide element 41 is shown in a first pivot position by solid lines in FIG. 1, wherein the crop string 50 exiting the bottom opening 13 of the rotor housing 11 is guided above the crop comminutor 47 and the crop distributing device 49 for discharge onto the ground 52 as a swath 51. When the crop guide element 41 is in the first position, the crop stream from the forced-draught fan 30 and the cleaning device 24 area is precluded from mixing with the crop string 50 being discharged from the grain/straw separator 10. In order to avoid crop congestion during processing of the harvested crop and to improve crop stream flow in and from the agricultural machine 1, the crop distributing device 49 dispenses a crop stream onto the field by broadcasting or in swaths. The crop distributing device 49 moves the short stalked straw and chaff in the crop-containing air stream 32 out of the agricultural harvester 1 to the ground 52 separate from the crop string 50, making it possible to deposit long-stalked straw as the swath 51 for later use. The agricultural harvester 1 discharges the crop-containing air stream 32 lateral and separate from the crop string 50. In the first position, the crop guide element 41 is used to preclude the crop string 50 and the crop-containing air stream 32 from being combined. The crop string 50 is precluded from entering the exhaust fan 37 and the crop distributing device 49. The crop string 50 being discharge from the grain/straw separator 10 bypasses the exhaust fan 37 and is deposited in the swath 51, while the crop-containing air stream 32 is discharged via the exhaust fan 37. The crop string 50 and the crop-containing air stream 32 do not come into contact each other in the first position.

The crop guide element 41 has a second pivot position shown by broken lines in FIG. 1, wherein the crop string 50 exiting the opening 13 of the rotor housing 11 passes through the crop comminutor 47 and is introduced to the crop stream 32 being conveyed away from the cleaning device 24, which is transferred in comminuted form or crop stream 53 to the crop distributing device 49.

Referring now to FIGS. 3 and 4, the crop stream 53 transferred from the crop comminutor 47 to the crop distributing device 49 is adjustable in its discharge direction 54–57. Crop guide webs 58 are curved and operatively connected to the crop distributing device 49, wherein the guide webs 58 are pivotable about shafts 59 operatively mounted to a housing 62. The guide webs 58 are adjustable. Guide bolts 60 are operatively attached to the guide webs 58 and independently guided in arcuate oblong-hole slots 61 of the housing 62. The guide bolts 60 are at one end of the guide webs 58. The guide webs 58 are combined into groups 63, 64, wherein the groups 63, 64 of the guide webs 58 are arranged inversely symmetrically to the center of the crop distributing device 49. The guide bolts 60 of the guide webs 58 of each group 63, 64 are connected to each other outside the housing 62 by guide web plates 65. This arrangement allows both of the groups 63, 64 of the guide webs 58 to pivot by a single coupling mechanism 66 about the respective shafts 59 into different positions. To avoid interference with crop flow within the crop distributing device 49, a coupling mechanism 66 is operatively arranged outside the housing 62. The coupling mechanism 66 has a central lever 67, which is rotatably mounted on the housing 62 of the crop distributing device 49 and operatively connected to a first pivot shaft 68 and a second pivot shaft 69. The coupling mechanism 66 rotatably receives coupling members 70, 71. The coupling members 70, 71 are rotatably mounted to the guide bolts 60 of the guide web 58 as shown in FIG. 3, wherein the coupling members 70, 71 are pivotable. Thus, the guide webs 58 can be simultaneously pivoted by manual or remote-control adjustment of the central lever 67 via a bolt 72 in a slot guide 73 operatively connected to the housing 62 of the crop distributing device 49.

FIG. 3 shows the central lever 67 in a first position of the slot guide 73. In the first position, the guide webs 58 in the slots 61 of the crop guide channels 74 "broadcast" the crop 53 conveyed into the crop distributing device 49 over the ground 52 in the discharge direction 54, 55. To move the central lever 67 from the first position to a second position, the central lever 67 is pivoted in the slot guide 73. FIG. 4 shows the central lever 67 in the second position of the slot guide 73. In the second position, the coupling members 70, 71 displace the guide bolts 60 of the guide webs 58, which are rotatably connected thereto within the oblong-hole slots 61, wherein the guide webs 58 coupled together by the guide web plates 65 are pivoted outwardly in a position transverse to the direction of travel. This results in the crop being discharged in directions 56, 57 because of the orientation of the crop guide channels 74, which are also displaced outwardly and transverse to the direction of travel FR. In the second position, the inner guide webs 58 operatively connected to the coupling members 70, 71 encounter each other in the region of their front ends, so that the crop guide channel 75 defined by these guide webs 58 is closed and consequently no more crop-containing air stream 53 can be conveyed through the crop guide channel 75. With the crop distributing device 49 in the second position, the agricultural harvester 1 discharges the crop string 50 through the bottom opening 13 of the rotor housing 11 along the guide plate 42 and above the crop guide element 41 and the crop distributing device 49, thereby discharging the swath 51 on the ground 52, while the crop-containing air stream 53 to be conveyed out of the agricultural harvester 1 by the crop comminutor 47 is laterally blown out of the agricultural harvester 1 transverse to the direction of travel FR and staggered and separated from the swath 51. This segregated discharge process ensures that the crop-containing air stream 53 exiting the agricultural harvester 1 does not interfere or disrupt the swath 51 on the ground 52.

FIG. 3 shows the adjacent, mutually facing groups 63, 64 of the guide webs 58 that produce a wide stream of crop from the crop guide channel 76 in the "broadcast" working or first position. The mutually facing groups 63, 64 of the guide webs 58 are operatively connected to an inner guide web 77, 78, which comes into contact with the crop-containing air stream 53 in the "broadcast" working or first position.

FIG. 4 shows the inner crop guide webs 77, 78 in a position behind the groups 63, 64 of crop guide webs 58 in the "side deposition" working or second position. The inner crop guide webs 77, 78 have a first end rotatably mounted to the housing 62 of the crop guide distributing device 49 such that the inner guide webs 77, 78 are rotatable about a pivot shaft 79. The inner crop guide webs 77, 78 have a second end operatively mounted to a guide bolt 80. The guide bolt 80 is movably mounted in a slot guide 81 in the housing 62. The coupling web 82 has a first end operatively attached to the guide bolt 80, where in the guide bolt is rotatably mounted thereon. The coupling web 82 has a second end operatively attached to the guide bolt 83, wherein the guide bolt 83 can also move within an oblong-hole guide 84 in the housing 62 and is non-rotatably connected at the bottom to the inside guide web 58 of the groups 63, 64. In this way, it is possible for the inner guide webs 77, 78 to be pivoted from a working position to a non-working position and vice versa on operation of the coupling mechanism 66.

The exhaust fan 37 and the crop guide distributing device 49 are not limited to an agricultural machine 1, but can be used on harvesters of any design such as combine harvesters with rack vibrators and/or multi-cylinder threshing mechanisms in order to obtain the functions previously described.

In an alternative embodiment, the guide webs 58 are rectilinear and arcuate. In another embodiment, the guide webs 58 and inner guide webs 77, 78 of the crop distributing device 49 are curvilinear or straight.

The crop distributing device 49 has the guide webs 58, which are moveable for directing the discharge of harvested crop in various locations. In addition, the crop distributing device can have the guide webs 58 divided into right and left groups that are controlled by a common adjusting mechanism. As a general rule, if the swath 51 is centrally deposited on the ground 52 behind the agricultural machine 1, the closable crop guide channel 76 is also arranged centrally on the crop distributing device 49.

To ensure that the closable crop guide channel 76 is maximally transverse to the direction of travel, the guide webs 58 defining the crop guide channel 76 are set at relatively large distances apart from each other. In order that reliable guiding of the crop-containing air stream in the crop distributing device 49 is ensured when the crop distributing device 49 is operated in the "broadcast" working position and in the "swath" working position, the guide webs 58 pivot back behind the crop distributing device 49, closing the crop guide channel 76.

The coupling members 70, 71, for simultaneously adjusting the positions of the guide webs 58 operatively attached to the coupling members 70, 71 by manual or remote-controlled operation, are provided to limit the expenditure on adjustment for the guide webs 58. To obtain maximum possible flexibility in the adjustable crop discharge direction, the guide webs 58 of the crop distributing device 49 are rectilinear or curved shape and pivotable over a wide pivot range, from a position pointing approximately in the direction opposite the direction of travel into a position transverse thereto.

What is claimed is:

1. A crop distributor for an agricultural machine having at least one crop processing work unit producing a first crop stream and an exhaust fan producing a second crop stream, said first and second crop streams being non-grain crop components, comprising;
    a crop distributing device operatively connected to the exhaust fan, having guide webs that are variable in position;
    a first working position for receiving said first crop stream and said second crop stream and wherein in said first working position, the first and the second crop streams are combined and discharged as a common crop stream; and
    a second working position wherein in said second working position, said first crop stream is discharged in swath form and said second crop stream is discharged in a separate direction from said first crop stream;
    wherein the guide webs have a side deposition working position, said side deposition working position discharging said second crop stream transverse to a direction of travel.

2. A crop distributor for an agricultural machine according to claim 1, wherein a central crop guide channels pivots between an engaged position and an unengaged position.

3. A crop distributor for an agricultural machine according to claim 1, wherein the guide webs are substantially straight.

4. A crop distributor for an agricultural machine according to claim 1, further including a common coupling mechanism for varying positions of the guide webs.

5. A crop distributor for an agricultural machine according to claim 1, wherein the guide webs are arcuate.

6. The crop distributor of claim 1 wherein said central path between an innermost pair of said guide webs is open in said first position and closed in said second position.

7. The crop distributor of claim 1 wherein said controlling step is executed mechanically via a series of guide pins, said guide pins being attached to said guide webs and said guide pins being disposed to move along guide slots in said distribution device.

8. The crop distributor of claim 1 wherein the second of the crop streams being discharged is substantially chaff and short straw.

9. The crop distributor of claim 1 wherein the first of the crop streams being discharged is substantially long straw.

10. The crop distributor of claim 1 wherein when the crop distributing device is operated in the second working position, the crop streams are staggered so as to not affect each other during discharge.

11. A crop distributor for an agricultural machine of claim 1 wherein said at least one crop processing work unit is a straw walker.

12. A crop distributor for an agricultural machine of claim 1 wherein said at least one crop processing work units is a rotor.

13. A crop distributor for an agricultural machine of claim 1 wherein said exhaust fan is a crop comminuter.

14. A crop distributor for an agricultural machine of claim 1 wherein said working unit is a multi cylinder threshing assembly.

15. A crop distributor for an agricultural machine of claim 1 wherein said first working unit is a rack vibrator.

16. A crop distributor for an agricultural machine of claim 4 wherein said mechanical coupling is remotely controlled.

17. A crop distributor for an agricultural machine having at least one crop processing work unit producing a first crop stream and an exhaust fan producing a second crop stream, said first and second crop streams being non-grain crop components, comprising;
    a crop distributing device operatively connected to the exhaust fan, having guide webs that are variable in position;
    a first working position for receiving said first crop stream and said second crop stream and wherein in said first working position, the first and the second crop streams are combined and discharged as a common crop stream; and
    a second working position wherein in said second working position, said first crop stream is discharged in swath form and said second crop stream is discharged in a separate direction from said first crop stream;

wherein the guide webs are divided into a first group and a second group and when the first group and the second group are placed in said second working position said first group discharges crop laterally to a first side and said second group discharges crop laterally to an opposite side of the agricultural machine.

18. A crop distributor for an agricultural machine having at least one crop processing work unit producing a first crop stream and an exhaust fan producing a second crop stream, said first and second crop streams being non-grain crop components, comprising;
   a crop distributing device operatively connected to the exhaust fan, having guide webs that are variable in position;
   a first working position for receiving said first crop stream and said second crop stream and wherein in said first working position, the first and the second crop streams are combined and discharged as a common crop stream; and
   a second working position wherein in said second working position, said first crop stream is discharged in swath form and said second crop stream is discharged in a separate direction from said first crop stream;
   wherein a guide channels is centrally arranged in said crop distributing device, and when said guide webs are in said second position, said central channel is in a closed position.

19. A crop distributor for an agricultural machine having at least one crop processing work unit producing a first crop stream and an exhaust fan producing a second crop stream, said first and second crop streams being non-grain crop components, comprising;
   a crop distributing device operatively connected to the exhaust fan, having guide webs that are variable in position;
   a first working position for receiving said first crop stream and said second crop stream and wherein in said first working position, the first and the second crop streams are combined and discharged as a common crop stream; and
   a second working position wherein in said second working position, said first crop stream is discharged in swath form and said second crop stream is discharged in a separate direction from said first crop stream;
   wherein the crop distributing device has three crop guide channels, which are adjustable from a first crop discharge direction, pointing essentially in a direction aligned with the direction of travel, to a second crop discharge direction, pointing transverse to the direction of travel.

20. A crop distributor for an agricultural machine having at least one crop processing work unit producing a first crop stream and an exhaust fan producing a second crop stream, said first and second crop streams being non-grain crop components, comprising;
   a crop distributing device operatively connected to the exhaust fan, having guide webs that are variable in position;
   a first working position for receiving said first crop stream and said second of the crop stream and wherein in said first working position, the first and the second crop streams are combined and discharged as a common crop stream; and
   a second working position wherein in said second working position, said first crop stream is discharged in swath form and said second crop stream is discharged in a separate direction from said first crop stream;
   wherein a central channel is defined by an innermost guide web of a first group of guide webs and by an innermost guide web of a second group of guide webs.

* * * * *